(12) United States Patent
Honda et al.

(10) Patent No.: US 10,968,599 B2
(45) Date of Patent: Apr. 6, 2021

(54) WORK MACHINE

(71) Applicant: Kubota Corporation, Osaka (JP)

(72) Inventors: Keigo Honda, Sakai (JP); Hiroshi Imamura, Sakai (JP); Yusuke Hada, Sakai (JP); Shunichiro Mori, Sakai (JP); Shinsuke Hisatake, Sakai (JP)

(73) Assignee: KUBOTA CORPORATION, Osaka (JP)

(*) Notice: Subject to any disclaimer, the term of this patent is extended or adjusted under 35 U.S.C. 154(b) by 213 days.

(21) Appl. No.: 16/427,354

(22) Filed: May 31, 2019

(65) Prior Publication Data

US 2020/0024827 A1 Jan. 23, 2020

(30) Foreign Application Priority Data

Jul. 20, 2018 (JP) .............................. JP2018-137185

(51) Int. Cl.
| | | |
|---|---|---|
| *E02F 9/08* | (2006.01) | |
| *F15B 1/26* | (2006.01) | |
| *B62D 33/06* | (2006.01) | |
| *E02F 9/26* | (2006.01) | |
| *E02F 9/16* | (2006.01) | |

(52) U.S. Cl.
CPC ............ *E02F 9/0866* (2013.01); *B62D 33/06* (2013.01); *E02F 9/0883* (2013.01); *E02F 9/0891* (2013.01); *E02F 9/166* (2013.01); *E02F 9/26* (2013.01); *F15B 1/26* (2013.01)

(58) Field of Classification Search
CPC ........... E02F 9/0866; E02F 9/26; B62D 33/06
USPC ...................................................... 296/190.08
See application file for complete search history.

(56) References Cited

U.S. PATENT DOCUMENTS

| 5,809,779 A * | 9/1998 | Bruso ....................... B09C 1/00 |
| | | 405/128.45 |
| 9,567,729 B2 | 2/2017 | Sumiyoshi et al. |
| 10,829,167 B2 * | 11/2020 | Storhaug .................. E02F 9/16 |
| 2003/0070861 A1 * | 4/2003 | Dahl .................... B62D 21/186 |
| | | 180/312 |
| 2014/0000729 A1 * | 1/2014 | Meyer ..................... G01M 3/28 |
| | | 137/487.5 |
| 2016/0251832 A1 * | 9/2016 | Kure ..................... E02F 9/0891 |
| | | 180/68.1 |
| 2017/0260714 A1 * | 9/2017 | Yamashita ............ E02F 9/0866 |

FOREIGN PATENT DOCUMENTS

JP          2016-69999          5/2016

* cited by examiner

*Primary Examiner* — Joseph D. Pape
(74) *Attorney, Agent, or Firm* — Mori & Ward, LLP

(57) ABSTRACT

A work machine includes a cabin, a machine room, a hydraulic oil tank, a partition wall, and a cover member. The machine room accommodates a drive apparatus to move the work machine. The hydraulic oil tank is provided in the machine room and has an oil gauge. The partition wall separates the cabin from the machine room and has an opening through which the oil gauge is viewable from the cabin. The cover member seals a gap between the partition wall and the oil gauge.

9 Claims, 8 Drawing Sheets

US 10,968,599 B2

WORK MACHINE

CROSS-REFERENCE TO RELATED APPLICATIONS

The present application claims priority under 35 U. S. C. § 119 to Japanese Patent Application No. 2018-137185, filed Jul. 20, 2018. The contents of this application are incorporated herein by reference in their entirety.

BACKGROUND OF THE INVENTION

Field of the Invention

The present invention relates to a work machine.

Discussion of the Background

The work machine disclosed in JP 2016-69999 A includes a cabin provided with a driver's seat, a drive device room in which a drive device is arranged, a hydraulic oil tank that is provided in the drive device room and to which an oil gauge is attached, and a vertical plate (partition wall) in which an opening part (view hole) is formed to correspond to the oil gauge and that separates the cabin and the drive device room.

SUMMARY OF THE INVENTION

According to one aspect of the present invention, a work machine includes a cabin, a machine room, a hydraulic oil tank, a partition wall, and a cover member. The machine room accommodates a drive apparatus to move the work machine. The hydraulic oil tank is provided in the machine room and has an oil gauge. The partition wall separates the cabin from the machine room and has an opening through which the oil gauge is viewable from the cabin. The cover member seals a gap between the partition wall and the oil gauge.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
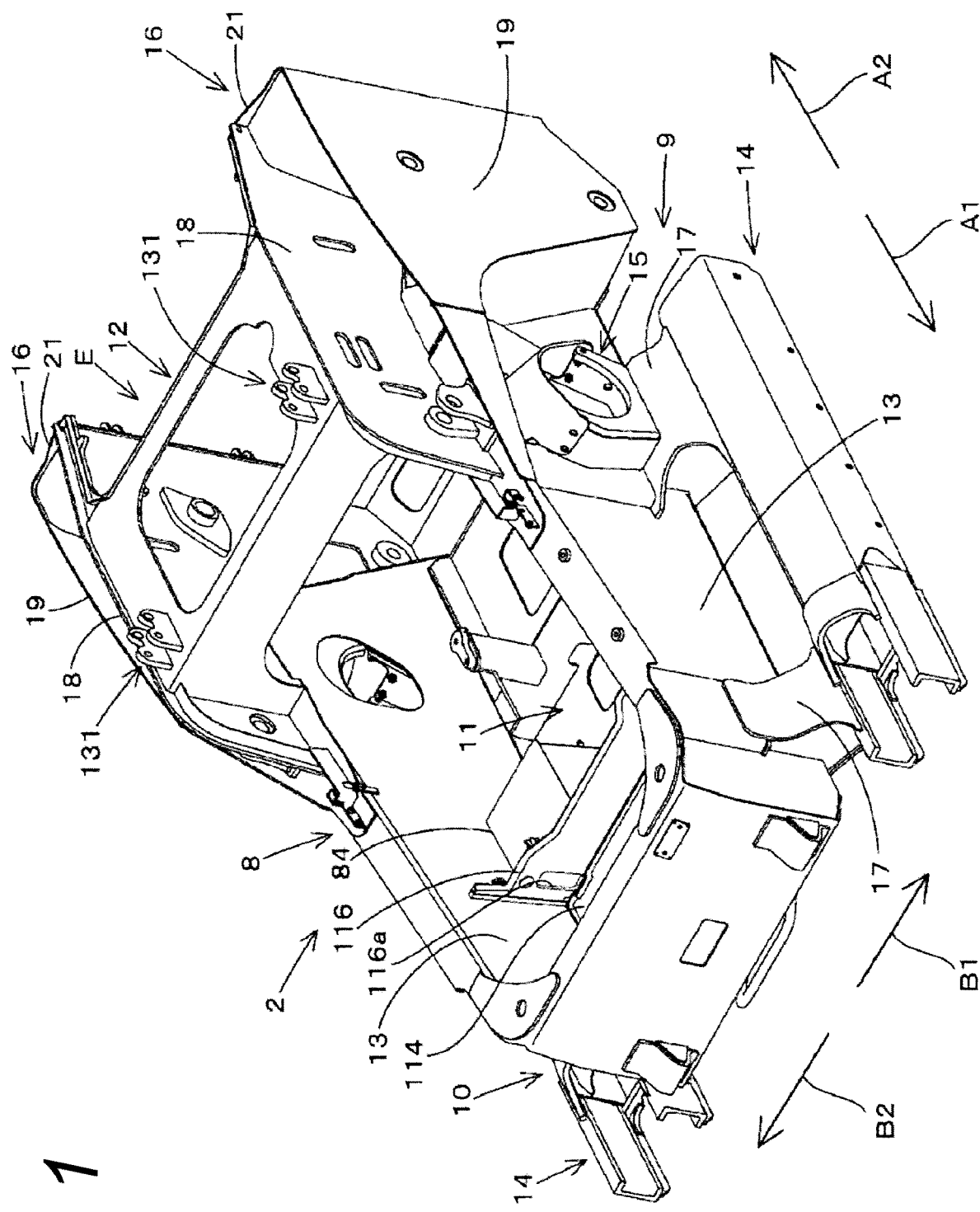
FIG. 1 is a left-front perspective view of a machine body.

The embodiments will now be described with reference to the accompanying drawings, wherein like reference numerals designate corresponding or identical elements throughout the various drawings.

An embodiment of the present invention will now be described herein with reference to the drawings.

Figure 8:
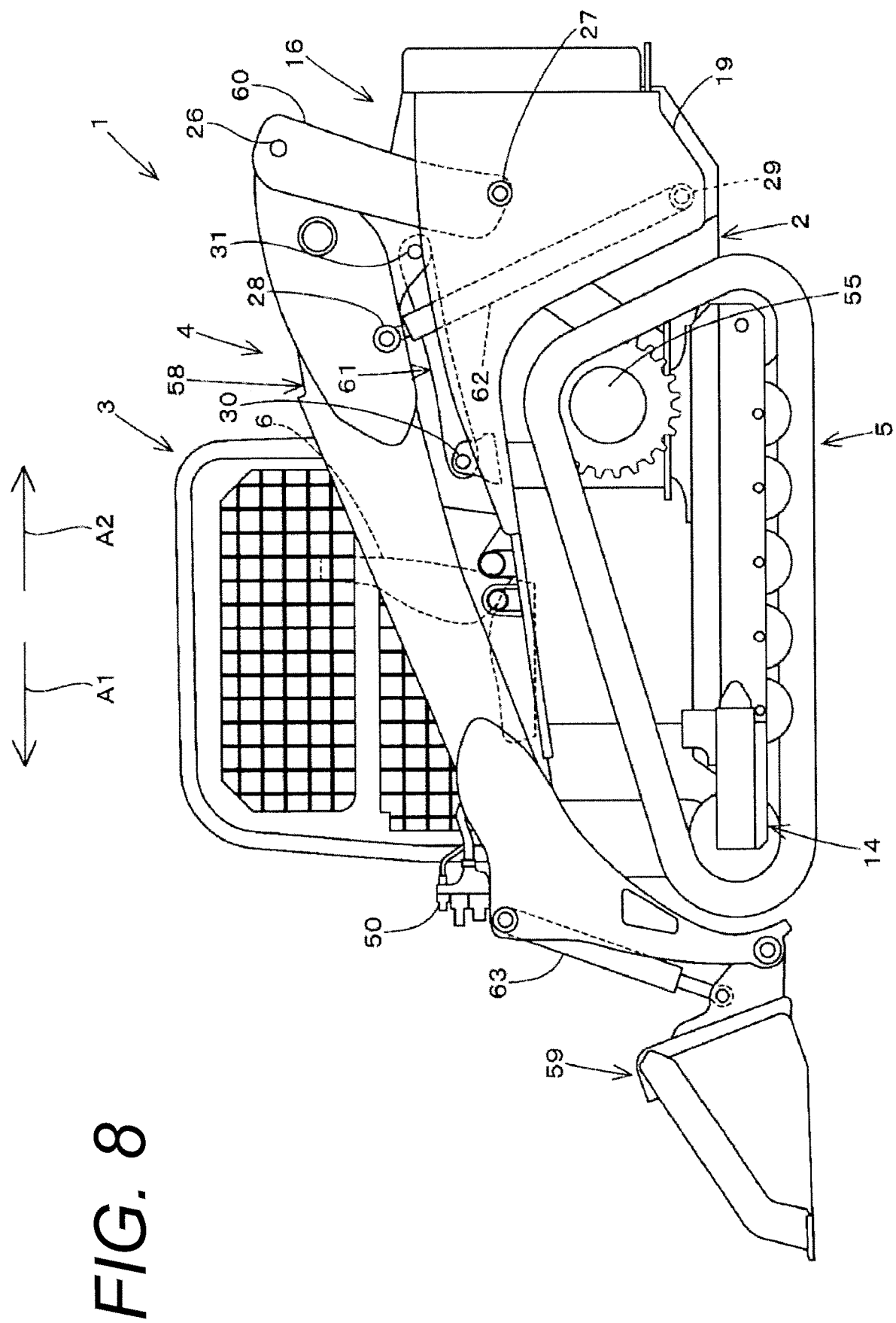
FIG. 8 is a left side view of a work machine.

FIG. 8 is a side view of a work machine 1 according to the present invention. FIG. 8 illustrates a compact track loader as an example of the work machine 1. However, the work machine according to the present invention is not limited to a compact track loader. The work machine may be another type such as skid-steer loader.

As illustrated in FIG. 8, the work machine 1 includes a machine body (vehicle body) 2, a cabin 3, a work device 4, and traveling devices 5. The cabin 3 is mounted on a front side of the machine body 2. A driver's seat 6 is provided inside the cabin 3. In the embodiment of the present invention, it is assumed that a front side (left side in FIG. 8) of a driver sitting on the driver's seat 6 of the work machine 1 is a forward direction, a back side (right side in FIG. 8) of the driver is a backward direction, a left side (near side in FIG. 8) of the driver is a leftward direction, and a right side (far side in FIG. 8) of the driver is a rightward direction. A horizontal direction orthogonal to a front-rear direction will be referred to as a width direction in the following description. Furthermore, it is assumed that a rightward or leftward direction from a central part of the machine body 2 will be referred to as a machine body outward direction. In other words, the machine body outward direction denotes the width direction that is a direction away from the machine body 2. Furthermore, it is assumed that a direction opposite to the machine body outward direction will be referred to as a machine body inward direction. In other words, the machine body inward direction is a direction toward the machine body 2 along the width direction. In FIG. 8, an arrow A1 indicates the forward direction, and an arrow A2 indicates the backward direction.

A driver's exit (not illustrated) for a driver getting on and off is provided on a front surface of the cabin 3. This driver's exit can be opened and closed by a transparent front panel (not illustrated). This front panel can be opened and closed from an outer side of the cabin 3 (cabin exterior) and an inner side (cabin interior).

As illustrated in FIG. 8, the work device 4 includes booms 58, a work tool 59, lift links 60, control links 61, boom cylinders 62, and bucket cylinders 63.

The booms 58 are provided to be swingable in an upper-lower direction on a right side and a left side of the cabin 3. The work tool 59 is a bucket, for example. The bucket 59 is provided to be swingable in the upper-lower direction on leading end parts (front end parts) of the booms 58. The lift links 60 and the control links 61 support base parts (back parts) of the booms 58 to allow the booms 58 to be swingable in the upper-lower direction. The boom cylinders 62 extend and contract to move up and down the booms 58. The bucket cylinders 63 extend and contract to allow the bucket 59 to swing.

Front parts of the booms 58 on the left side and the right side are coupled with each other through a curved and forked coupling pipe. The base parts (back parts) of the booms 58 are coupled with each other through a circular coupling pipe.

The lift links 60, the control links 61, and the boom cylinders 62 are provided on a left side and a right side of the machine body 2 to correspond to the booms 58 on the left side and the right side.

The lift links 60 are respectively vertically provided on the back parts of the base parts of the booms 58. Upper parts (one end sides) of the lift links 60 are pivoted rotatably about a horizontal axis closer to the back parts of the base parts of the booms 58 through a pivotal shaft 26 (first pivotal shaft). Lower parts (other end sides) of the lift links 60 are pivoted rotatably about the horizontal axis closer to a back part of the machine body 2 through a pivotal shaft 27 (second pivotal shaft). The second pivotal shaft 27 is provided below the first pivotal shaft 26.

Upper parts of the boom cylinders 62 are pivoted rotatably about the horizontal axis through a pivotal shaft 28 (third pivotal shaft). The third pivotal shaft 28 is provided on the front parts of the base parts of the booms 58. Lower parts of the boom cylinders 62 are pivoted rotatably about the horizontal axis through a pivotal shaft 29 (fourth pivotal shaft). The fourth pivotal shaft 29 is provided closer to a lower part of the back part of the machine body 2 and below the third pivotal shaft 28.

As illustrated in FIG. 8, the control links 61 are respectively provided in front of the lift links 60. Ends of the control links 61 are pivoted rotatably about the horizontal axis through a pivotal shaft 30 (fifth pivotal shaft). The fifth pivotal shaft 30 is provided on the machine body 2 at positions corresponding to front sides of the lift links 60. Other ends of the control links 61 are pivoted rotatably about the horizontal axis through a pivotal shaft 31 (sixth pivotal shaft). The sixth pivotal shaft 31 is provided, on the booms 58, in front of the second pivotal shaft 27 and above the second pivotal shaft 27.

As the boom cylinders 62 extend and contract, while the base parts of the booms 58 are supported by the lift links 60 and the control links 61, the booms 58 swing about the first pivotal shaft 26 in the upper-lower direction. The leading end parts of the booms 58 thus move up and down. As the booms 58 swing in the upper-lower direction, the control links 61 swing about the fifth pivotal shaft 30 in the upper-lower direction. As the control links 61 swing in the upper-lower direction, the lift links 60 swing about the second pivotal shaft 27 in the front-rear direction.

Instead of the bucket 59, another work tool is attachable to the front parts of the booms 58. Examples of the other work tool include attachments (auxiliary attachments) such as a hydraulic crusher, a hydraulic breaker, an angle broom, an earth auger, a pallet folk, a sweeper, a mower, and a snow blower.

As illustrated in FIG. 8, a coupling member 50 is provided at the front part of the left side one of the booms 58. The coupling member 50 is a device configured to couple a hydraulic instrument provided on an auxiliary attachment and first pipe members such as pipes provided on the booms 58. Specifically, one end of the coupling member 50 is connectable to the first pipe member, and another end is connectable to a second pipe member connected with the hydraulic instrument of the auxiliary attachment. With this configuration, hydraulic oil flowing through the first pipe member passes through the second pipe member before being supplied to the hydraulic instrument.

The bucket cylinders 63 are respectively arranged closer to front parts of the booms 58. As the bucket cylinders 63 extend and contract, the bucket 59 swings.

As illustrated in FIG. 8, crawler type traveling devices are adopted as the traveling devices 5 in the present embodiment. The traveling devices 5 are provided on the left side and the right side of the machine body 2. The traveling devices 5 may be wheel type traveling devices.

Figure 2:
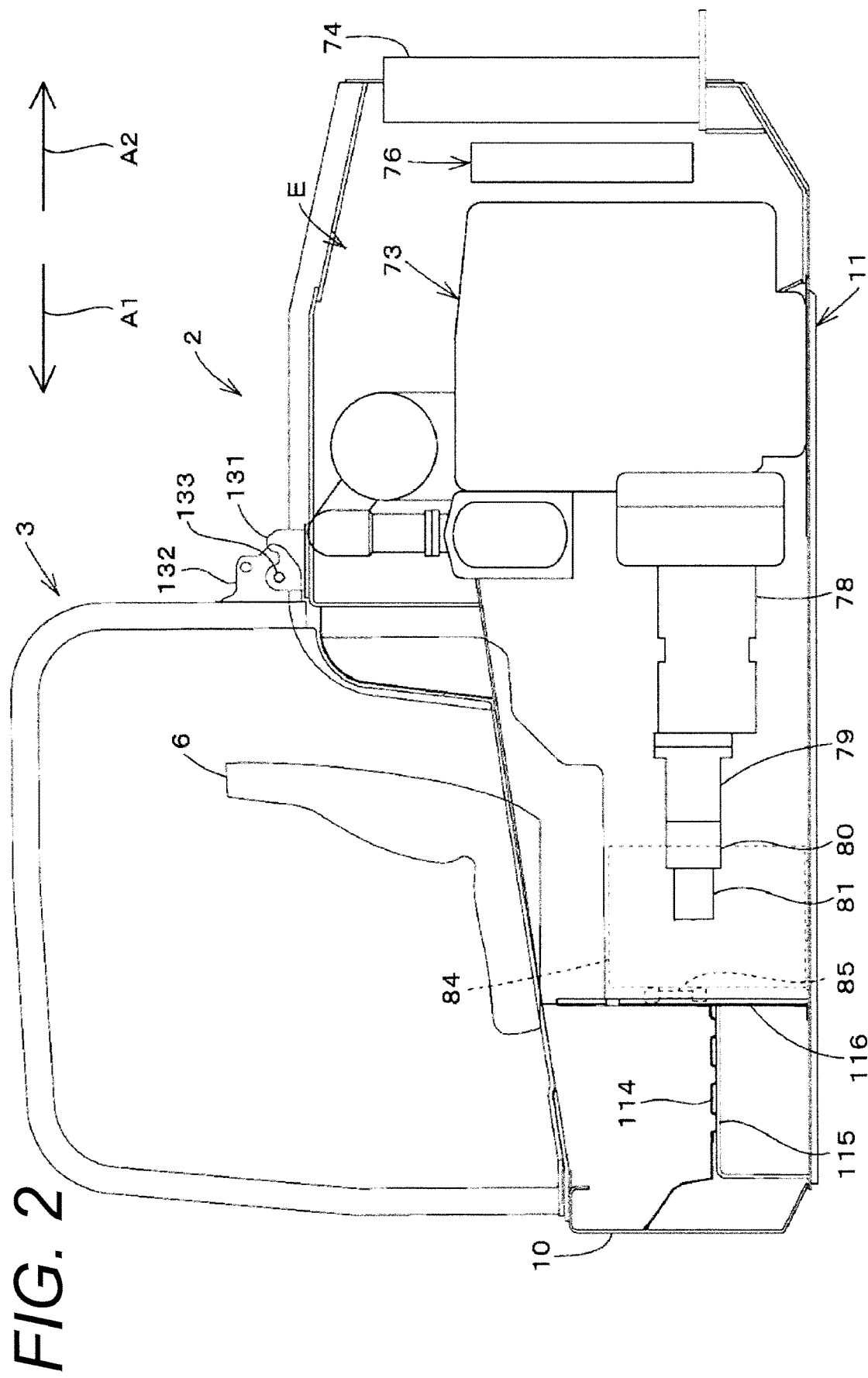
FIG. 2 is a left-side schematic diagram of inside the machine body.

The machine body 2 will be described herein in detail with mainly reference to FIGS. 1 and 2. FIG. 1 is a left-front perspective view of the machine body 2. FIG. 2 is a left-side schematic diagram of the inside of the machine body. In FIGS. 1 and 2, the arrow A1 indicates the forward direction, the arrow A2 indicates the backward direction, an arrow B1 indicates the leftward direction, and an arrow B2 indicates the rightward direction. As shown in FIG. 1, the machine body 2 has a right side frame portion 8, a left side frame portion 9, a front frame portion 10, a bottom frame portion 11, and an upper frame portion 12. The right side frame portion 8 forms a right part of the machine body 2. The left side frame portion 9 forms a left part of the machine body 2. The front frame portion 10 forms a front part of the machine body 2, and couples front parts of the right side frame portion 8 and the left side frame portion 9. The bottom frame portion 11 forms a bottom part of the machine body 2, and couples lower parts of the right side frame portion 8 and the left side frame portion 9. The upper frame portion 12 forms a rear upper part of the machine body 2, and couples rear upper parts of the right side frame portion 8 and the left side frame portion 9.

Each of the side frame portions 8 and 9 has a main frame 13, a track frame 14, a motor attachment portion 15, and a support frame 16. The main frame 13 is arranged in such a manner that plate surfaces are directed in the width direction, and provided ranging from the front part of the machine body 2 to a rear part. The track frame 14 is attached to a lower part of an outer side surface of the main frame 13 via attachment members 17. The motor attachment portion 15 is provided in a rear upper part of the outer side surface of the main frame 13. The support frame 16 is attached to a rear part of the main frame 13.

The support frame 16 includes an inner wall 18, an outer wall 19, and a rear wall 21. The inner wall 18 and the outer wall 19 are provided so as to face each other and spaced from each other in the width direction. The outer wall 19 is positioned at a side of the inner wall 18 facing the outside of the machine body. The rear wall 21 extends from a rear end of the outer wall 19 toward the inside of the machine body. A machine body inner end part of this rear wall 21 is fixed to a rear end side of the inner wall 18.

As illustrated in FIG. 1, pivotably supporting brackets 131 pivotably supporting the cabin 3 are provided in a front part of the upper frame portion 12. As shown in FIG. 2, coupling brackets 132 are provided in a back surface lower part of the cabin 3. The coupling brackets 132 (rear part of the cabin 3) are pivotably supported on the pivotably supporting brackets 131 so as to be rotated about the lateral axis via a support shaft 133 in the width direction. Therefore, by rotating the cabin 3 about the support shaft 133, the cabin 3 can be swung upward from a state where the cabin 3 is disposed on the machine body 2 shown in FIG. 8.

As illustrated in FIGS. 1 and 2, at the front part inside the machine body 2, i.e., in front of the driver's seat 6, a partition wall (vertical plate) 116 and a step 114 are provided. The partition wall 116 is a flat plate member, and is vertically arranged behind the front frame portion 10 with a gap interposed between the partition wall 116 and the front frame portion 10 to allow plate surfaces to face forward and backward. As illustrated in FIG. 1, in the partition wall 116, an opening part (view hole) 116a is formed. The opening part 116a is formed on a right side of the partition wall 116. The opening part 116a is a through hole penetrating in the front-rear direction. The opening part 116a is an elongate hole having a longer length in an upper-lower direction than a length in the width direction. In other words, the opening part 116a is a substantially rectangular shaped hole extending longer in the upper-lower direction.

The step 114 serves as a portion where a driver sitting on the driver's seat 6 rests the feet. The step 114 has a plate shape, and is arranged sideways to allow plate surfaces (front and back) to face upward and downward. Specifically, the step 114 is provided ranging from the front frame portion 10 to the vertical plate 116, and also ranging from the right side frame portion 8 to the left side frame portion 9. The step 114 is provided at a height position of an up-down middle part of the front part of the machine body 2.

As illustrated in FIG. 2, the step 114 is attached to the machine body 2 via a support member 115. Specifically, the support member 115 is a bracket member having a reversed L-shape bending backward at a middle part when viewed from side. A lower end part of the support member 115 is coupled to the bottom frame portion 11. The step 114 is placed on the support member 115. A rear end side of the step 114 is attached to the vertical plate 116.

As illustrated in FIG. 2, a drive device room E (a machine room E) is arranged on the back part inside the machine body 2. The drive device room E is separated from the cabin 3 by the partition wall 116. In other words, the partition wall 116 separates the cabin 3 and the drive device room E. A drive device 73 and a radiator 74 are mounted in the drive device room E. The drive device 73 is an engine in the embodiment, and, more specifically, is a diesel engine. The radiator 74 is provided behind the engine 73. A cooling fan 76 is provided between the engine 73 and the radiator 74. The cooling fan 76 is driven by an output shaft of the engine 73 and blows air rearward (toward the radiator 74).

As illustrated in FIG. 2, at a front part of the drive device room E, a plurality of hydraulic pumps 78, 79, 80, and 81 are provided to align in the front-rear direction. Specifically, the plurality of hydraulic pumps 78, 79, 80, and 81 are arranged at a front part of the engine 73. In the present embodiment, the hydraulic pump 78 is a traveling pump, the hydraulic pump 79 is a main pump, the hydraulic pump 80 is a sub pump, and the hydraulic pump 81 is a pilot pump. The hydraulic pumps 78, 79, 80, and 81 supply hydraulic oil in a hydraulic oil tank 84 to a predetermined hydraulic instrument provided to the work machine 1.

The traveling pump 78 is a hydraulic pump that drives the traveling motors 55. In addition, this traveling pump 78 is a variable-displacement hydraulic pump forming a part of a hydrostatic continuously variable transmission together with the traveling motors 55. The main pump 79, the sub pump 80, and the pilot pump 81 are fixed-displacement type gear pumps. The main pump 79 is a hydraulic pump that drives hydraulic actuators installed in the work device 4 and hydraulic actuators installed in a hydraulic attachment attached to the work device 4. The sub pump 80 is a hydraulic pump used for increasing an amount of the hydraulic oil. The pilot pump 81 is mainly used for supplying control signal pressure.

As illustrated in FIGS. 1 and 2, the work machine 1 includes the hydraulic oil tank 84 provided at the front part of the drive device room E. The hydraulic oil tank 84 is a tank configured to store the hydraulic oil used to operate hydraulic actuators. The hydraulic oil tank 84 has a substantially rectangular shape, for example. The hydraulic oil tank 84 is arranged on a right side at the front part of the machine body 2. More specifically, the hydraulic oil tank 84 is arranged on the right side behind the partition wall 116.

Figure 3:
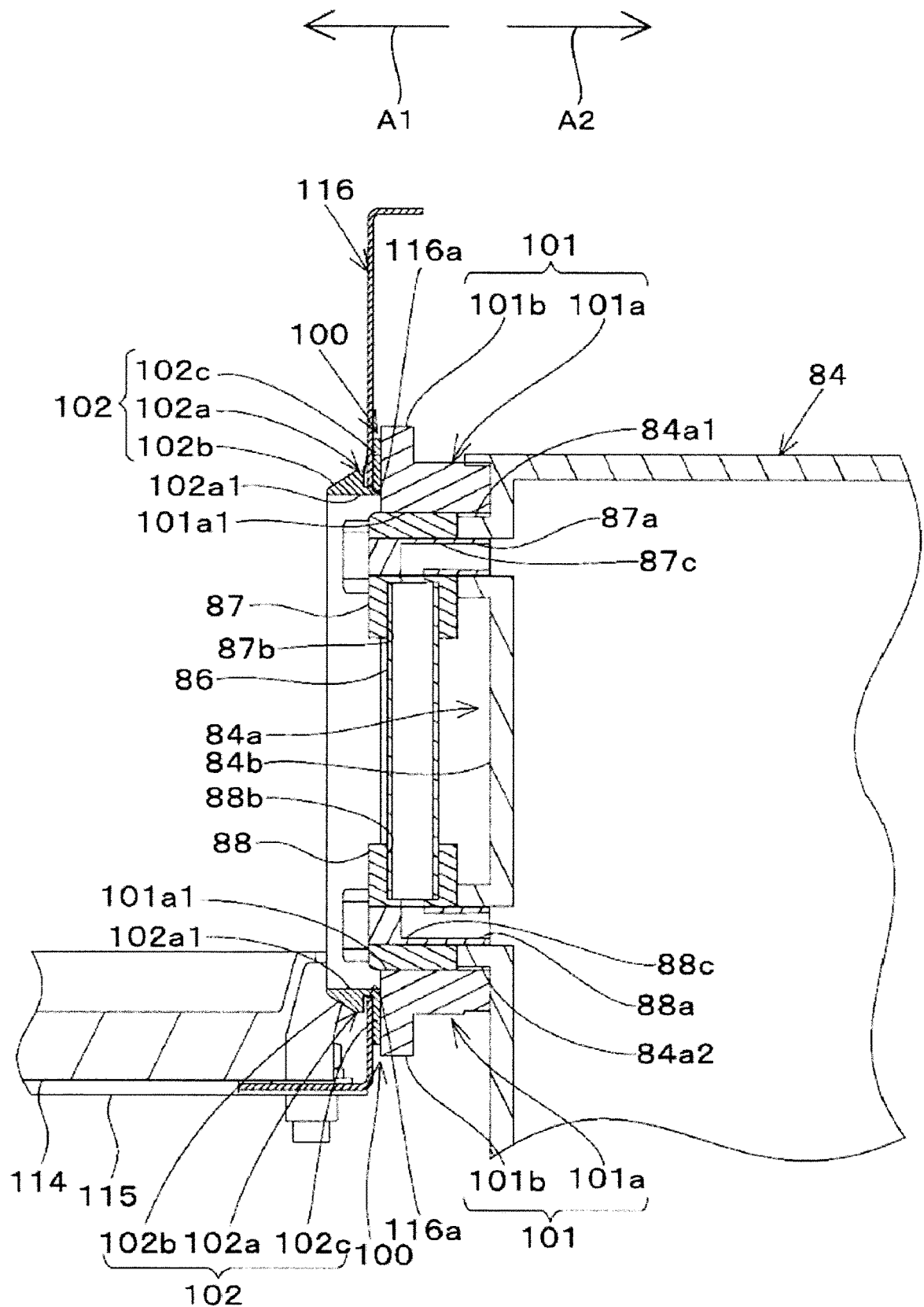
FIG. 3 is a left-side cross-sectional view illustrating an oil gauge, a first peripheral wall, a second peripheral wall, and a partition wall.

FIG. 3 is a left-side cross-sectional view illustrating the hydraulic oil tank 84 and the partition wall 116, for example. In FIG. 3, the arrow A1 indicates the forward direction, and the arrow A2 indicates the backward direction.

As illustrated in FIG. 3, the hydraulic oil tank 84 includes an attachment portion 84a to which an oil gauge (fluid level gauge) 85 is attached. The attachment portion 84a is provided on a counter surface 84b facing the partition wall 116. The attachment portion 84a includes a boss 84a1 and a boss 84a2 protruding from the counter surface 84b toward the partition wall 116. The boss 84a1 and the boss 84a2 are formed away from each other in the upper-lower direction. A space defined between the boss 84a1 and the boss 84a2 and a space inside the hydraulic oil tank 84 are in communication with each other.

Figure 4:
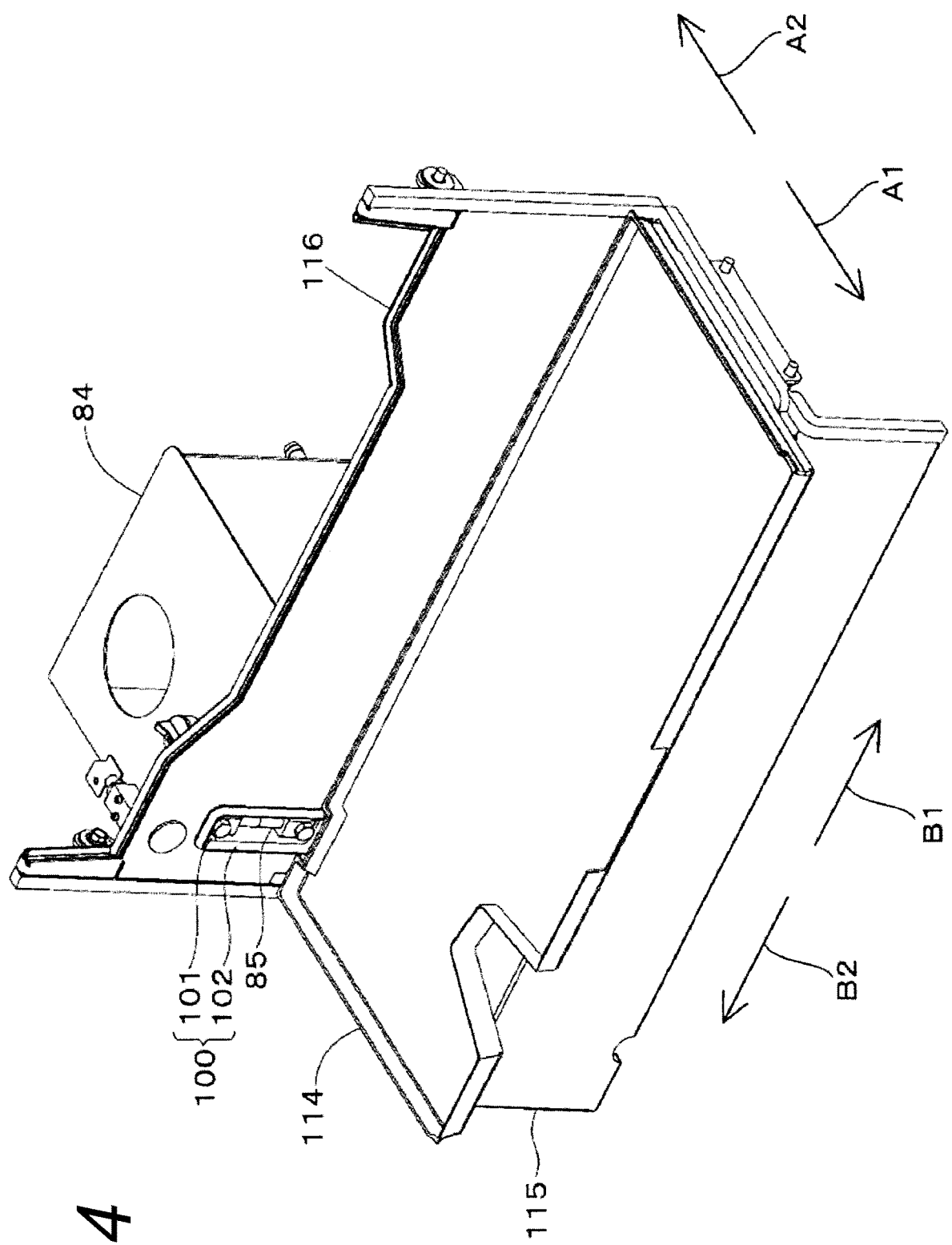
FIG. 4 is a left-front perspective view illustrating a step, the partition wall, a cover member, and the oil gauge.
Figure 5:
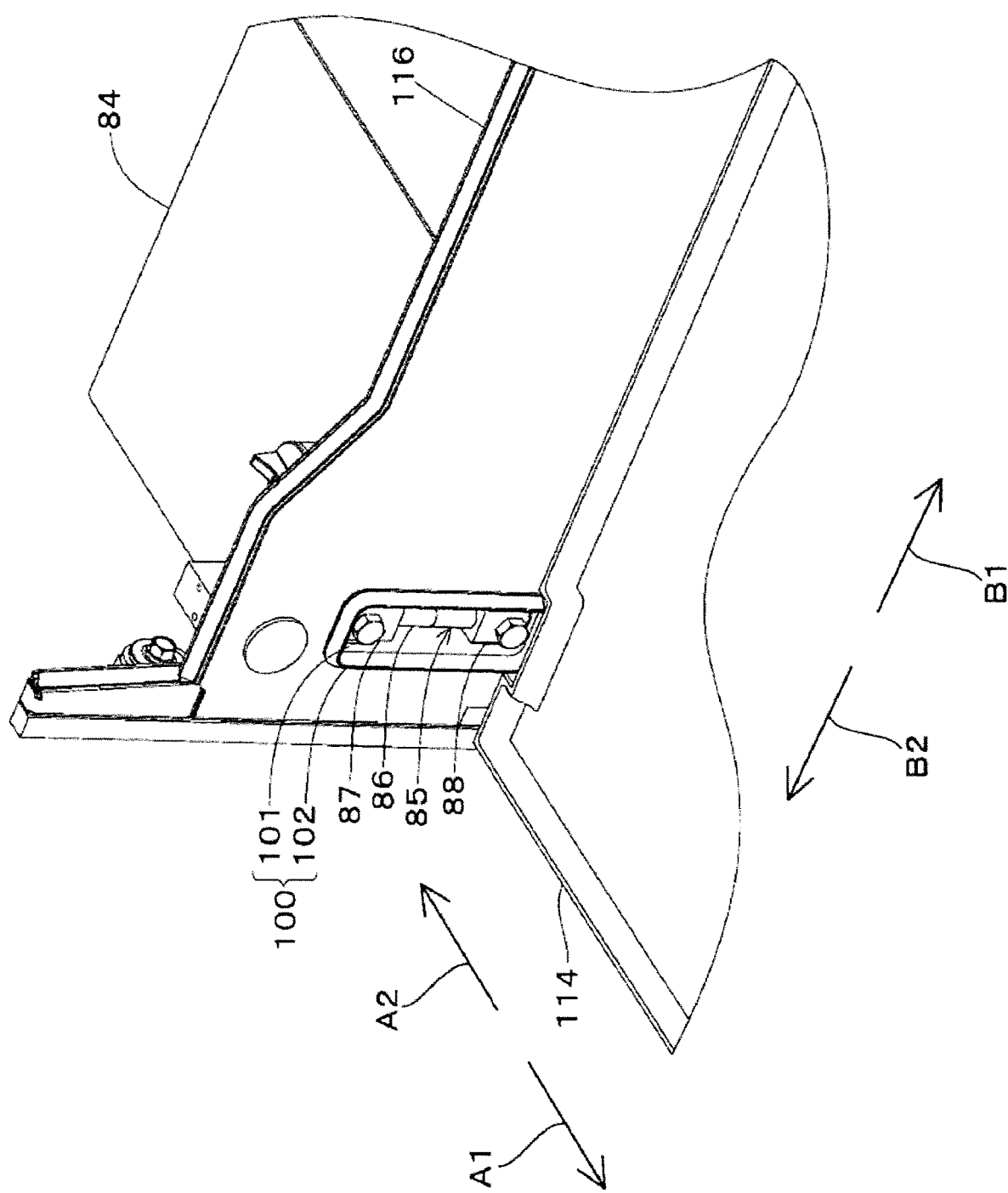
FIG. 5 is a left-front perspective view illustrating the partition wall, the cover member, and the oil gauge.
Figure 6:
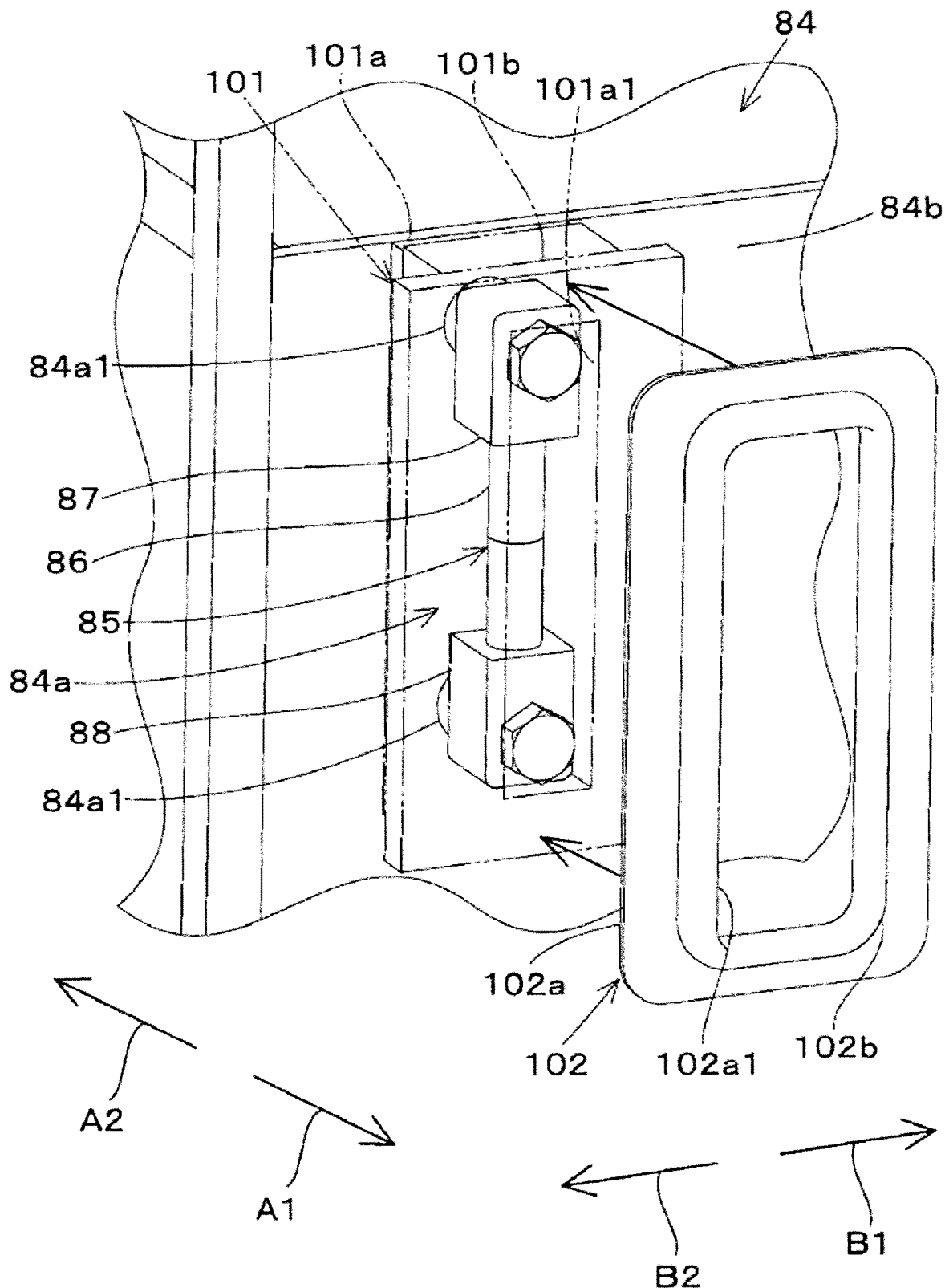
FIG. 6 is an exploded perspective view illustrating the oil gauge, the first peripheral wall, the second peripheral wall, and the partition wall.
Figure 7:
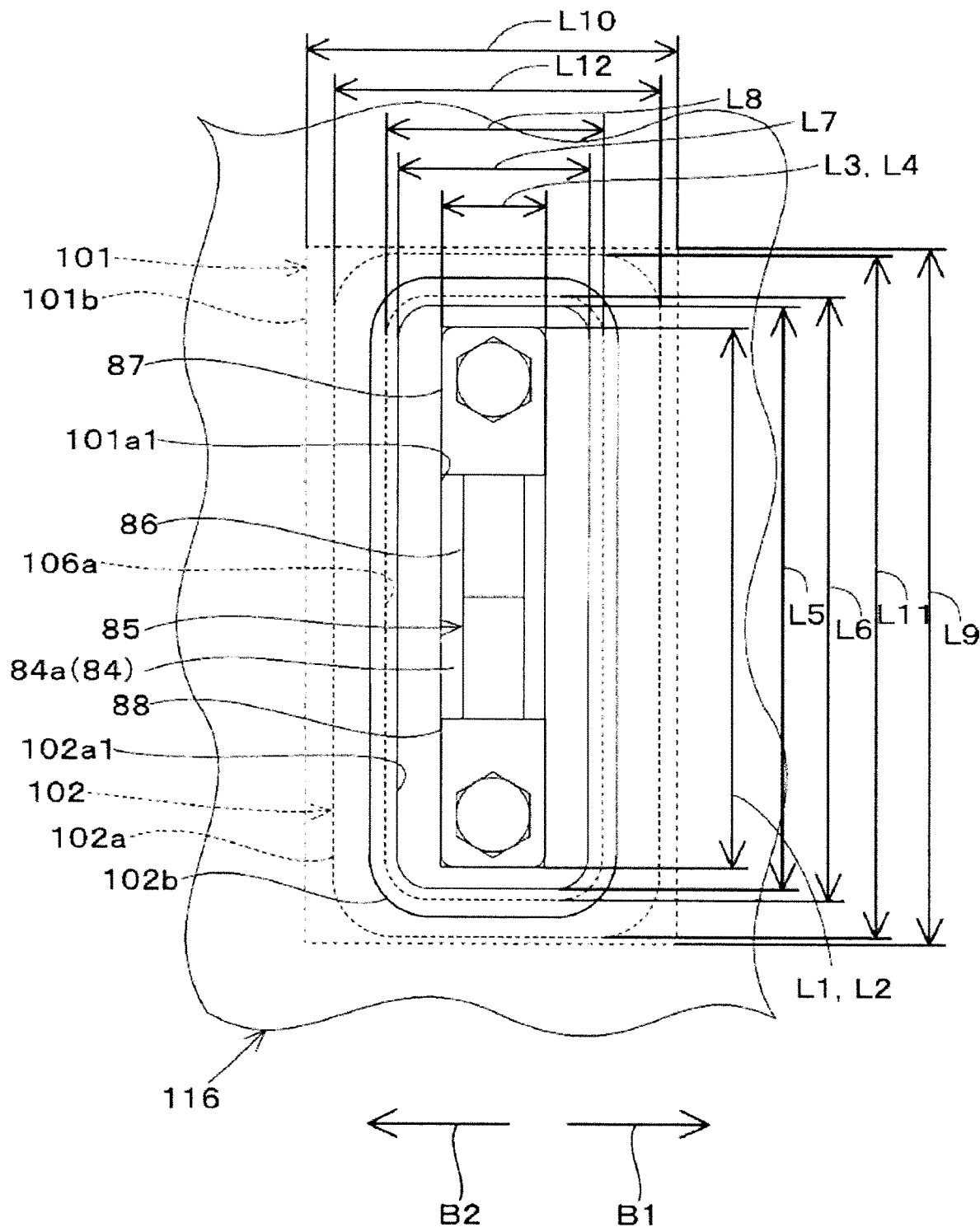
FIG. 7 is a front view illustrating the oil gauge, the first peripheral wall, the second peripheral wall, and the partition wall.

The oil gauge 85 will be described herein in detail with mainly reference to FIGS. 3 to 7. FIG. 4 is a left-front perspective view illustrating the oil gauge 85, the step 114, and the partition wall 116, for example. FIG. 5 is a left-front perspective view illustrating the oil gauge 85 and the partition wall 116, for example. FIG. 6 is an exploded perspective view illustrating the oil gauge 85 and the hydraulic oil tank 84, for example. FIG. 7 is a front view illustrating the oil gauge 85 and the partition wall 116, for example. In FIGS. 4 to 7, the arrow A1 indicates the forward direction, the arrow A2 indicates the backward direction, the arrow B1 indicates the leftward direction, and the arrow B2 indicates the rightward direction.

As illustrated in FIGS. 3, 6, and 7, for example, the oil gauge 85 includes a gauge pipe 86 and upper and lower joints 87 and 88. The gauge pipe 86 is formed from a hollow, transparent pipe, and is vertically arranged in front of the hydraulic oil tank 84.

As illustrated in FIGS. 3, 6, and 7, for example, the upper side joint (upper joint) 87 couples an upper end of the gauge pipe 86 to the hydraulic oil tank 84. The upper joint 87 is a member having a substantially rectangular shape. Holes 87a and 87b are respectively formed on a back part and a lower part of the upper joint 87. The hole 87a on the back part and the hole 87b on the lower part are in communication with each other via a channel 87c formed inside the upper joint 87. An end of the upper joint 87 is coupled to the boss 84a1, whereas another end is coupled to the upper end of the gauge pipe 86.

The lower side joint (lower joint) 88 couples a lower end of the gauge pipe 86 to the hydraulic oil tank 84. The lower joint 88 is a member having a substantially rectangular shape. Holes 88a and 88b are respectively formed on a back part and an upper part of the lower joint 88. The hole 88a on the back part and the hole 88b on the upper part are in communication with each other via a channel 88c formed inside the lower joint 88. An end of the lower joint 88 is coupled to the boss 84a2, whereas another end is coupled to the lower end of the gauge pipe 86. As illustrated in FIG. 3, the gauge pipe 86 is thus in communication with the space inside the hydraulic oil tank 84 via the joints 87 and 88 and the attachment portion 84a (the bosses 84a1 and 84a2). The hydraulic oil in the hydraulic oil tank 84 flows into the gauge pipe 86. By viewing a fluid level in the gauge pipe 86, an operator can check an amount of the hydraulic oil in the hydraulic oil tank 84. The fluid level in the gauge pipe 86 can be checked through the opening part 116a formed on the partition wall 116 from inside the cabin 3.

As illustrated in FIG. 7, the oil gauge 85 is arranged to correspond to the opening part 116a of the partition wall 116. The opening part 116a is formed greater than an external shape of the oil gauge 85, when viewed from front.

The oil gauge 85 is arranged inside an edge part forming the opening part 116a, when viewed from front. An operator can thus check the fluid level in the oil gauge 85 through the opening part 116a.

As illustrated in FIGS. 3 to 7, the work machine 1 includes a cover member 100. As illustrated in FIG. 3, the cover member 100 surrounds the oil gauge 85, i.e., across an area between the partition wall 116 and the attachment portion 84a (the hydraulic oil tank 84). More specifically, the cover member 100 is provided between the partition wall 116 and the counter surface 84b. The cover member 100 is formed from an elastic member having flexibility, such as rubber or sponge.

The cover member 100 includes a first peripheral wall 101 (a first peripheral member 101) and a second peripheral wall 102 (a second peripheral member 102). The first peripheral wall 101 is a member defining a side (back side) of the cover member 100, which lies adjacent to the hydraulic oil tank 84. The second peripheral wall 102 is a member defining a side (front side) of the cover member 100, which lies adjacent to the cabin 3. That is, the first peripheral wall 101 and the second peripheral wall 102 align with each other in the front-rear direction.

As illustrated in FIG. 3, the first peripheral wall 101 is provided between the partition wall 116 and the attachment portion 84a. The first peripheral wall 101 includes a cylinder part 101a and an abutting part 101b.

As illustrated in FIGS. 3 and 6, the cylinder part 101a is a hollow cylinder part having a longer length in the upper-lower direction (vertical direction) than a length in the width direction (horizontal direction). The cylinder part 101a is a cylinder part in which a first hole 101a1 is formed in the front-rear direction (a direction from the inside of the cabin 3 to the inside of the drive device room E or a direction in which the opening part 116a is open). The first hole 101a1 is an elongate rectangular shaped hole having a longer length in the vertical direction than a length in the horizontal direction.

More specifically, as illustrated in FIG. 7, a length L1 in the vertical direction of the first hole 101a1 is substantially identical to a length L2 in the vertical direction of the oil gauge 85. In the oil gauge 85 according to the present embodiment, the upper end and the lower end of the gauge pipe 86 are respectively coupled with the joints 87 and 88. The length L1 in the vertical direction of the first hole 101a1 is thus substantially identical to the length L2 from an upper end of the upper joint 87 to a lower end of the lower joint 88. On the other hand, as illustrated in FIG. 7, a length L3 in the horizontal direction of the first hole 101a1 is substantially identical to a length L4 in the horizontal direction of the oil gauge 85. In the oil gauge 85 according to the present embodiment, the gauge pipe 86 is arranged inside a space in the horizontal direction defined between the joints 87 and 88. The length L3 in the horizontal direction of the first hole 101a1 is thus substantially identical to the length L4 in the horizontal direction of the joints 87 and 88. The first peripheral wall 101 is attached to the oil gauge 85 to allow the first hole 101a1 to surround the oil gauge 85. In other words, the oil gauge 85 fits to the first hole 101a1. A rear end part of the cylinder part 101a abuts the counter surface 84b of the attachment portion 84a (the hydraulic oil tank 84).

As illustrated in FIGS. 3 and 6, the abutting part 101b is a part on a flange protruding from a front end part of the cylinder part 101a toward the outside of the oil gauge 85 (the vertical direction and the horizontal direction). In other words, the abutting part 101b is a part forming a front end part of the first peripheral wall 101.

The second peripheral wall 102 is attached to the partition wall 116 to protrude from the partition wall 116 toward an opposite side of the first peripheral wall 101 (toward the cabin 3). The second peripheral wall 102 is formed from a member having lesser flexibility (harder member) than the first peripheral wall 101, and a second hole 102a1 is formed in the second peripheral wall 102.

As illustrated in FIGS. 3 and 5, for example, the second peripheral wall 102 is attached to an edge part forming an opening part 106a of the partition wall 116. Specifically, the second peripheral wall 102 includes a lock part 102a, a protrusion 102b, and an abutting part 102c. The lock part 102a is a part configured to be locked onto the edge part forming the opening part 106a of the partition wall 116, and is, for example, a groove formed into a recess. The protrusion 102b protrudes from the lock part 102a toward the cabin 3 (forward). The protrusion 102b is inclined forward (from the cabin 3 toward the drive device room E) in the vertical direction and the horizontal direction (toward the outside of the oil gauge 85). In other words, the protrusion 102b has a forward tapered shape. An upper part of the protrusion 102b and the partition wall 116 form an obtuse angle.

The abutting part 102c is formed continuously with the protrusion 102b to lie closer to the hydraulic oil tank 84 than the protrusion 102b. The abutting part 102c has a plate shape defining a surface (back surface), which is adjacent to the hydraulic oil tank 84, of the second peripheral wall 102. The abutting part 102c abuts a surface (front surface), which is adjacent to the partition wall 116, of the first peripheral wall 101.

The lock part 102a, the protrusion 102b, and the abutting part 102c are integrally formed continuously in a thickness direction (front-rear direction). Inner surfaces (inner walls) of the lock part 102a, the protrusion 102b, and the abutting part 102c define the second hole 102a1. An length L5 in the vertical direction of the second hole 102a1 is shorter than a length L6 in the vertical direction of the opening part 106a, but longer than the length L2 in the vertical direction of the oil gauge 85. On the other hand, a length L7 in the horizontal direction of the second hole 102a1 is shorter than a length L8 in the horizontal direction of the opening part 106a, but longer than the length L4 in the horizontal direction of the oil gauge 85.

A position relationship among the oil gauge 85, the opening part 106a, the first peripheral wall 101, and the second peripheral wall 102 will be described herein with mainly reference to FIGS. 3 and 7.

As illustrated in FIG. 3, a front end of the oil gauge 85 is arranged to protrude from the opening part 106a toward the cabin 3. In other words, the front end of the oil gauge 85 is arranged at a position closer to the cabin 3 (front side) than a front surface of the partition wall 116. The partition wall 116 does not block light heading toward the oil gauge 85. Light inside the cabin 3 therefore becomes incident on the oil gauge 85. Without using a lighting apparatus, for example, an operator can easily check the fluid level in the oil gauge 85.

As illustrated in FIG. 7, the second hole 102a1 of the second peripheral wall 102 is arranged inside the opening part 106a, when viewed from front. The oil gauge 85 and the first hole 101a1 of the first peripheral wall 101 are arranged inside the second hole 102a1 of the second peripheral wall 102, when viewed from front. An operator can thus check the fluid level in the oil gauge 85 through the second hole 102a1 of the second peripheral wall 102.

As illustrated in FIG. 7, the first peripheral wall 101 and the second peripheral wall 102 surround an outer periphery of the oil gauge 85. A length L9 in the vertical direction of the abutting part 101b of the first peripheral wall 101 is at least longer than the length L6 in the vertical direction of the opening part 116a. On the other hand, a length L10 in the horizontal direction of the abutting part 101b is at least longer than the length L8 in the horizontal direction of the opening part 116a.

At least one of a difference between the length L9 in the vertical direction of the abutting part 101b and the length L5 in the vertical direction of the second hole 102al (L9 −L5) and a difference between a length L11 in the vertical direction of the lock part 102a and the length L5 in the vertical direction of the second hole 102al (L11−L5) is greater than a difference between the length L5 in the vertical direction of the second hole 102al and the length L2 in the vertical direction of the oil gauge 85 (L5−L2). On the other hand, at least one of a difference between the length L10 in the horizontal direction of the abutting part 101b and the length L7 in the horizontal direction of the second hole 102al (L10−L7) and a difference between a length L12 in the horizontal direction of the lock part 102a and the length L7 in the horizontal direction of the second hole 102al (L12−L7) is greater than a difference between the length L7 in the horizontal direction of the second hole 102al and the length L4 in the horizontal direction of the oil gauge 85 (L7−L4). Even when the oil gauge 85 is displaced in the vertical direction or a left-right direction inside the second hole 102al, when viewed from front, the abutting part 101b of the first peripheral wall 101 and the lock part 102a of the second peripheral wall 102 can abut across the outer periphery of the oil gauge 85. The space inside the cabin 3 and the space inside the drive device room E can thus be securely partitioned.

The work machine 1 described above includes the cabin 3 provided with the driver's seat 6, the drive device room E in which the drive device 73 is arranged, the hydraulic oil tank 84 that is provided in the drive device room E and that includes the attachment portion 84a to which the oil gauge 85 is attached, the partition wall 116 in which the opening part 106a is formed to correspond to the oil gauge 85 and that separates the cabin 3 and the drive device room E, and the cover member 100 surrounding the oil gauge 85 across an area between the partition wall 116 and the attachment portion 84a.

With the configuration described above, the cover member 100 is provided between the partition wall 116 and the attachment portion 84a. The space inside the cabin 3 and the space inside the drive device room E can thus be partitioned. Internal pressure of the cabin 3 can therefore be inhibited from lowering. The oil gauge 85 can be placed inside the cabin 3. While sand, dust, and dirt, for example, are inhibited from entering from the drive device room E into the cabin 3, the oil gauge 85 can be checked through the opening part 116a.

The cover member 100 includes the first peripheral wall 101 provided between the partition wall 116 and the attachment portion 84a, and the second peripheral wall 102 protruding from the partition wall 116 toward the cabin 3 lying opposite to the first peripheral wall 101.

With the configuration described above, the cover member 100 is separated into the first peripheral wall 101 and the second peripheral wall 102. The first peripheral wall 101 and the second peripheral wall 102 can thus be easily attached. Even when an error in attachment is generated between the partition wall 116 and an area around the hydraulic oil tank (the oil gauge 85), both of the first peripheral wall 101 and the second peripheral wall 102 can correct the error.

The first peripheral wall 101 includes the cylinder part 101a surrounding the oil gauge 85, and the abutting part 101b protruding from the cylinder part 101a toward the outside of the oil gauge 85 to abut the second peripheral wall 102.

With the configuration described above, the cylinder part 101a can prevent sand, dust, and dirt, for example, in the drive device room E from entering into the oil gauge 85. In addition, the abutting part 101b can improve sealing performance.

The second peripheral wall 102 includes the lock part 102a configured to be locked onto the edge part forming the opening part 106a, and the protrusion 102b protruding from the lock part 102a toward the cabin 3.

With the configuration described above, the protrusion 102b protruding toward the cabin 3 can keep the legs of an operator, for example, from coming into contact with the oil gauge 85.

The protrusion 102b is inclined from the cabin 3 toward the drive device room E and toward the outside of the oil gauge 85.

With the configuration described above, the second peripheral wall 102 is inserted into the opening part 106a from the drive device room E toward the cabin 3. The second peripheral wall 102 can thus be easily attached to the partition wall 116. A time for attaching the second peripheral wall 102 to the partition wall 116 can therefore be shortened, reducing a production cost. The partition wall 116 and the upper part of the protrusion 102b form an obtuse angle. Even when an operator comes into contact with the protrusion 102b, the configuration prevents the operator from being caught. The second peripheral wall 102 can thus be kept from dropping from the partition wall 116. Furthermore, even when sand, dust, and dirt, for example, enter into the cabin 3 and drop onto the upper part of the protrusion 102b, the sand, dust, and dirt, for example, can be easily removed.

The oil gauge 85 protrudes from the partition wall 116 toward the cabin 3.

With the configuration described above, the partition wall 116 does not block light heading toward the oil gauge 85. Light inside the cabin 3 therefore becomes incident on the oil gauge 85. Without using a lighting apparatus, for example, an operator can easily check the oil gauge 85.

The oil gauge 85 is arranged at a position closer to the drive device room E than the cover member 100.

With the configuration described above, the second peripheral wall 102 protruding toward a position closer to the cabin 3 than the oil gauge 85 can keep the legs of an operator, for example, from coming into contact with the oil gauge 85 lying behind the second peripheral wall 102.

The hydraulic oil tank 84 has the counter surface 84b that is provided with the attachment portion 84a and that faces the partition wall 116. The cover member 100 is provided between the partition wall 116 and the counter surface 84b.

With the configuration described above, the cover member 100 is provided between the partition wall 116 and the counter surface 84b. The space inside the cabin 3 and the space inside the drive device room E can thus be further securely partitioned. Internal pressure of the cabin 3 can therefore be further inhibited from lowering. While sand, dust, and dirt, for example, are further inhibited from entering from the drive device room E into the cabin 3, the oil gauge 85 can be checked through the opening part 116a.

The present invention is described above. The embodiment disclosed herein is thought to be not restriction but an example in all aspects. The scope of the present invention is indicated not by the above description but by the claims, and is intended to include equivalent meanings to the claims and all modifications within the scope.

Obviously, numerous modifications and variations of the present invention are possible in light of the above teachings. It is therefore to be understood that within the scope of the appended claims, the invention may be practiced otherwise than as specifically described herein.

What is claimed is:

1. A work machine comprising:
   a cabin;
   a machine room accommodating a drive apparatus to move the work machine;
   a hydraulic oil tank provided in the machine room and having an oil gauge;
   a partition wall which separates the cabin from the machine room and which has an opening through which the oil gauge is viewable from the cabin; and
   a cover member sealing a gap between the partition wall and the oil gauge.

2. The work machine according to claim 1,
   wherein the hydraulic oil tank includes an attachment portion to which an oil gauge is attached, and
   wherein the cover member includes
      a first peripheral member provided between the partition wall and the attachment portion, and
      a second peripheral member protruding from the partition wall toward the cabin opposite to the first peripheral member.

3. The work machine according to claim 2, wherein the first peripheral member includes
   a cylinder part surrounding the oil gauge, and
   an abutting part protruding from the cylinder part toward an outside of the oil gauge to abut the second peripheral member.

4. The work machine according to claim 2, wherein the second peripheral member includes
   a lock part configured to be locked onto an edge part forming the opening, and
   a protrusion protruding from the lock part toward the cabin.

5. The work machine according to claim 4, wherein the protrusion is inclined from the cabin toward the drive device room and toward the outside of the oil gauge.

6. The work machine according to claim 1, wherein the oil gauge protrudes from the partition wall toward the cabin.

7. The work machine according to claim 1, wherein the oil gauge is arranged at a position closer to the drive device room than the cover member.

8. The work machine according to claim 1,
   wherein the hydraulic oil tank includes an attachment portion to which an oil gauge is attached,
   wherein the hydraulic oil tank has a surface provided with the attachment portion, the surface facing the partition wall, and
   wherein the cover member is provided between the partition wall and the surface.

9. The work machine according to claim 2,
   wherein the cabin is rotatable with the partition wall and the second peripheral member with respect to the machine room, and
   wherein the first peripheral member is configured to abut against the second peripheral member when the oil gauge is viewable from the cabin through the opening.

* * * * *